Figure 1:
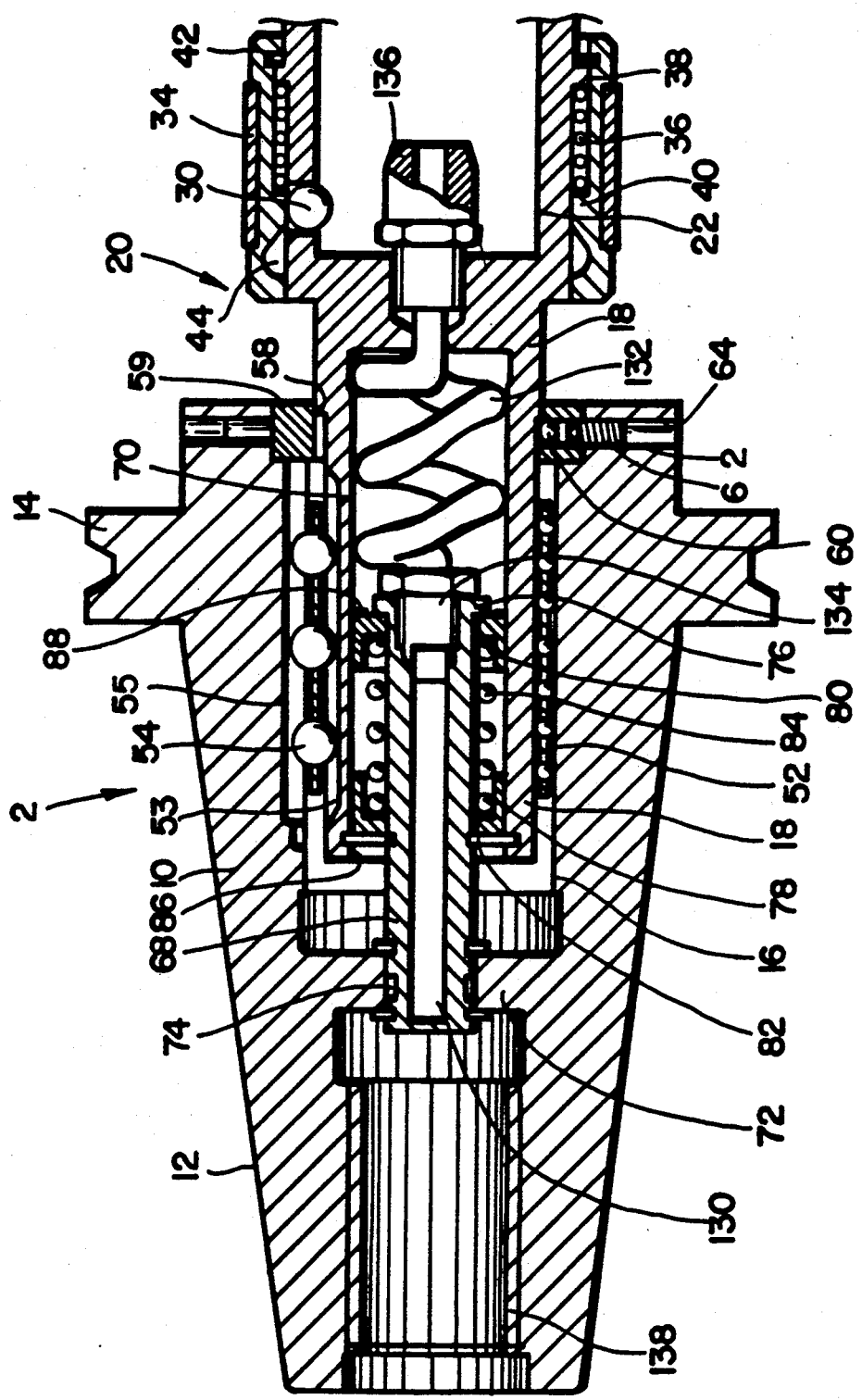

United States Patent [19]

Petrie

[11] Patent Number: 5,076,740
[45] Date of Patent: Dec. 31, 1991

[54] TOOLHOLDERS FOR MACHINE TOOLS

[75] Inventor: Laurence R. Petrie, Hebden Bridge, England

[73] Assignee: Braodbent Machine Tools (Halifax) Limited, West Yorkshire, England

[21] Appl. No.: 151,391

[22] Filed: Feb. 2, 1988

Related U.S. Application Data

[63] Continuation of Ser. No. 777,296, Sep. 18, 1985, Pat. No. 4,812,089.

[30] Foreign Application Priority Data

Sep. 29, 1984 [GB] United Kingdom ................. 8424674

[51] Int. Cl.⁵ ................................................ B23G 1/46
[52] U.S. Cl. .................................. 408/59; 10/141 H; 10/89 F; 279/20; 408/141
[58] Field of Search ...................... 408/56, 61, 139, 14, 408/59, 141; 409/175; 279/20; 10/89 F, 141 H

[56] References Cited

U.S. PATENT DOCUMENTS

| | | | |
|---|---|---|---|
| 2,731,538 | 1/1956 | Sherman et al. | 279/20 X |
| 2,892,387 | 6/1959 | Russell, Jr. | 409/175 |
| 2,969,132 | 1/1961 | Stewart | 192/56 R |
| 3,117,329 | 1/1964 | Raymond | 408/139 |
| 3,487,748 | 1/1970 | Grage | 408/59 X |
| 4,088,418 | 5/1978 | Dann | 408/139 |
| 4,396,317 | 8/1983 | Staron et al. | 408/59 |

Primary Examiner—Z. R. Bilinsky
Attorney, Agent, or Firm—W. Thad Adams, III

[57] ABSTRACT

A toolholder for holding a cutting tool such as a tap in the spindle of a machine tool includes a torque-limiting clutch to prevent excessive load being applied to the cutting tool. The clutch comprises at least one ball located in sockets in the driving and driven members but there is an arrangement, whereby at a predetermined critical torque, the ball moves axially out of engagement with one of the driving and driven members to disconnect the drive, and a deflecting device engages with the ball and moves it to a position where it does not encounter the socket from which it has been released or any similar sockets. This prevents wear on the clutch.

The toolholder also comprises a conduit system for cutting fluid being fed into a bore in the cutting tool. The conduit extends through a telescopic part of the toolholder and includes a flexible part deviating from a straight linear form, so that it can extend by tending to straighten, in order to accommodate telescopic extension of the toolholder.

3 Claims, 5 Drawing Sheets

TOOLHOLDERS FOR MACHINE TOOLS

This application is a continuation of application Ser. No. 777,296, filed on 9/18/85, now U.S. Pat. No. 4,812,089.

The invention relates to tool holders for use in machine tools, of the kind in which the cutting tool is carried in a spindle of the machine and rotated about a longitudinal axis in use. A typical example of this type of cutting tool is a tap, and the invention is particularly applicable to holders for taps (tappers) but could also be applied to toolholders intended to hold other rotary tools, e.g. drills and reamers.

Such toolholders, and especially tappers, are frequently required to incorporate a torque-limiting clutch, which is operative in the forward direction of rotation, as a means of protecting the cutting tools against the application of excess load. A known kind of torque-limiting clutch employs spring loaded balls located in a driving member and urged into sockets in the driven member. When the predetermined torque is exceeded, the springs yield allowing the balls to climb out of their sockets, thus disconnecting the drive. However, as the driving member continues to rotate after disconnection of the clutch, the balls run over the mouths of the sockets in the driven member, and this creates a clicking noise and produces wear of the mouths of the sockets and the balls themselves. It is the object of one aspect of the invention to provide a toolholder with a torque limiting feature, in which the part are not subject to excess wear.

According to one aspect of the invention a toolholder for use in a machine tool has coaxial rotary driving and driven members with a torque limiting clutch operative between them, the clutch comprising at least one ball which in a driving position locates in sockets in both the driving and driven members; resilient loading resisting movement of the ball out of the driving position, but permitting disengagement of the ball from the socket in one of the driving and driven members when a predetermined torque is exceeded, the socket from which the ball disengages when the predetermined torque is exceeded being so arranged that the disengaging motion of the ball includes a component in a direction axial of the toolholder, and a deflecting device engageable by the ball when the latter becomes so disengaged from the socket, and adapted to produce a motion of the ball to a position where it does not encounter the socket or sockets in the member from which it has disengaged during continued rotation of the driving member after such disengagement.

Preferably, the deflecting device comprises an abutment on one of the driving and driven members, having a forward direction ball engaging face which is tangential to a circle about the axis of rotation of the toolholder so that the reaction to the force applied between the abutment and the ball during attempted further rotation of the ball following its disengagement from the socket in one of the driving and driven members produces a compound motion of the ball relatively to the member from which it has disengaged to a position radially outwards of the path of rotation of the socket from which it has disengaged, and any similar sockets.

It is further preferred that the abutment is part of a flange extending from and rotatable with the driven member, the arrangement permitting movement of the ball out of a socket in the driving member when the predetermined torque is exceeded. Preferably, the driving direction ball engaging face is an outward continuation of the socket in the driven member, so that the radial outward movement of the ball under the influence of the deflecting device moves the ball out of the socket in the driven member, and into a position radially outwards of the socket or sockets in the driving member.

In the preferred construction there is an annular rib on the inside edge of the axially facing surface of the driving member in which the sockets open, this rib being adapted to retain the ball on its outside when the ball disengages from the socket in the driving member to facilitate the outward radial motion of the ball. It is further preferred to form an outward "rake" on the said axial face of the driving member to co-operate with the resilient loading and the action of the deflecting device to provide a force acting on the ball to assist in the outward radial motion of the ball.

According to another preferred feature of the invention, the resilient load is applied in an axial direction to resist the axial component of the ball's permitted motion. It is further preferred that the initial disengaging motion is substantially entirely in an axial direction. Preferably a retaining member is provided which is free to move in an axial direction, but resiliently loaded into engagement with the ball on the opposite side of the ball to the member from which the ball can disengage. It is further preferred that the resilient load is provided by a compression spring acting between the retaining member and a fixed abutment on the toolholder. Further, it is preferred that the spring pressure is adjustable by an adjusting ring having screw-threaded engagement with a non-rotatable part of the toolholder body, the ring providing the abutment for engagement with the compression spring. The spring may take the form of one or more spring washers.

In the preferred construction, the socket in the driven member is elongated in the axial direction to permit the axial component of motion of the ball when it disengages from the socket in the driving member. Also, in the preferred construction, the driving member surrounds the driven member, the socket in the driven member opens on the periphery of that member and the socket in the driving member opens into the bore and one axial face of the driving member. The driving member preferably has one or more dogs for engagement with a rotary component secured in the machine tool spindle.

According to yet another preferred feature of the invention, the deflecting device abutment further comprises a reverse direction ball engaging face which is tangential to a circle about the axis of rotation of the toolholder, so that the reaction to the force applied between the abutment and the ball during reverse motion of the driven member produces a compound motion of the ball relatively to the member from which it is disengaged, to a position where it re-engages in the socket in that member. Where the abutment is part of a flange on the driven member, the ball may be located in a slot formed in that flange, one side of the slot forming the forward direction ball engaging face and the other side providing the reverse direction ball engaging face.

According to a still further preferred feature of the invention, the socket from which the ball disengages when the torque exceeds the predetermined amount comprises a deep portion which is adapted to embrace at least 90° of the periphery of the ball in a plane parallel to the direction of thrust applied in use to the ball, and a shallow portion breaking into the deep portion and adapted to embrace less than 90° of the periphery of the ball from the said plane, the shallow portion being on one side of the deep portion, so that in the forward direction of rotation, the ball occupies the shallow portion of the socket and in the reverse direction of rotation, the ball occupies the deep portion of the socket. The significance of this arrangement is that the ball can climb out of the shallow portion of the socket, against its resilient loading, but cannot climb out of the deep portion of the socket no matter what load is applied to it. Hence, the torque-limiting characteristic is only available in the forward direction of rotation.

Another problem associated with the use of rotary type toolholders in machine tools is that of supplying cutting fluid to the tool under relatively high pressure (say of the order of 300 lbs. per square inch). In tapping for instance, it is desirable to force cutting fluid through the tap itself (and taps are bored to provide a canal for the cutting fluid) so that the fluid emerges from the tool in the hole which is being tapped, where, if it is under a sufficiently high pressure, it forces swarf produced by the tapping operation out of the hole. Obviously, it is necessary to supply the cutting fluid under pressure through the toolholder, but a problem which has been encountered in practice is that the high pressure fluid creates internal forces acting on the components of the toolholder itself. This problem is exacerbated in the case of an axially telescopic tapped, because the high pressure fluid tends to force the movable part of the tapper out of the stationary part.

An object of a second aspect of the invention is to provide an axially telescopic tapper with means for satisfactorily supplying cutting fluid under high pressure to the tap itself.

According to a second aspect of the invention, an axially telescopic tapper for use in a machine tool comprises: a stationary part adapted to be held in the machine spindle and a movable part adapted to receive the tap or a tap adapter, there being provision for limited axial displacement of the movable part relatively to the stationary part, and a cutting fluid supply system inside the tapper and including a flexible conduit attached to one end to the stationary part and at the other end to the movable part, the flexible conduit deviating from a straight linear form, so that it is capable of extension by tending to straighten. By confining the cutting fluid into a conduit where it passes through the tapper, it is ensured that the fluid does not pressurise the relatively movable components of the tapper. Moreover, the fluid will not contaminate the internal mechanism of the tapper.

In the preferred construction, the flexible conduit has at least a part helical formation and preferably the flexible conduit makes at least one complete convolution which provides the required variable length of conduit to accommodate the permitted extension of the tapper in use. The flexible conduit is preferably made of plastics materials, such as nylon.

Preferably there is provided within the stationary part of the tapper a tubular retainer which is formed with an abutment for a compression spring adapted to resist extension of the tapper, and the flexible conduit is attached at one end to this tubular retainer, so that the retainer provides a part of the cutting fluid passage through the tapper.

A third aspect of the invention is concerned with the mechanism for permitting and restraining axial extension and/or compression of the tapper—i.e. the displacement of the movable part relatively to the stationary part.

According to the third aspect of the invention, an extensible tapper for use in a machine tool comprises: a stationary part having a central finger like retainer; a movable part having a sleeve surrounding but radially spaced from the retainer; outer and inner pusher members within the sleeve and mechanically connected to the sleeve so that the inner pusher member will be pushed in the outward direction by the sleeve but will not be pushed by the sleeve in the inward direction when the sleeve moves inwardly, and the outer pusher will be pushed in the inward direction by the sleeve but will not be pushed by the sleeve in the outward direction when the sleeve moves outwardly; fixed abutments on the retainer for limiting inward movement of the inner pusher and outward of the outer pusher, and a spring opposing movement of the two pusher members towards each other.

With this arrangement, on the outward motion of the sleeve i.e. extension of the tapper) from a free, unloaded condition, the outer pusher is held by its engagement with a fixed abutment and the inner pusher is moved with the sleeve towards the outer pusher, against the spring loading. When the sleeve moves inwardly from the extended position, the inner pusher first moves back to the free, unloaded position, under the influences of the spring loading. If the movable part is pressed inwardly (i.e. compression of the tapper) the inner pusher is held by its engagement with a fixed abutment, but the outer pusher is pushed inwardly by the sleeve so that the two pusher members move towards each other against the spring loading. Therefore the single spring loading is used to oppose both extension and contraction of the tapper.

Extension of the tapper occurs under the normal operating conditions, in which the tap is drawn into the workpiece when the rate of feed of the tap due to its cutting action exceeds the rate of feed of the tap holder by the machine tool, whereas compression of the tapper occurs for example if, when the machine tool spindle is fed towards a workpiece, the tap encounters a resistance, particularly when it arrives at the bottom of a hole.

In the preferred construction, the spring comprises a compression spring located between the pusher members and surrounding the finger like retainer. The retainer itself may be tubular and used as part of the passage through the tapper for cutting fluid.

Figure 2:
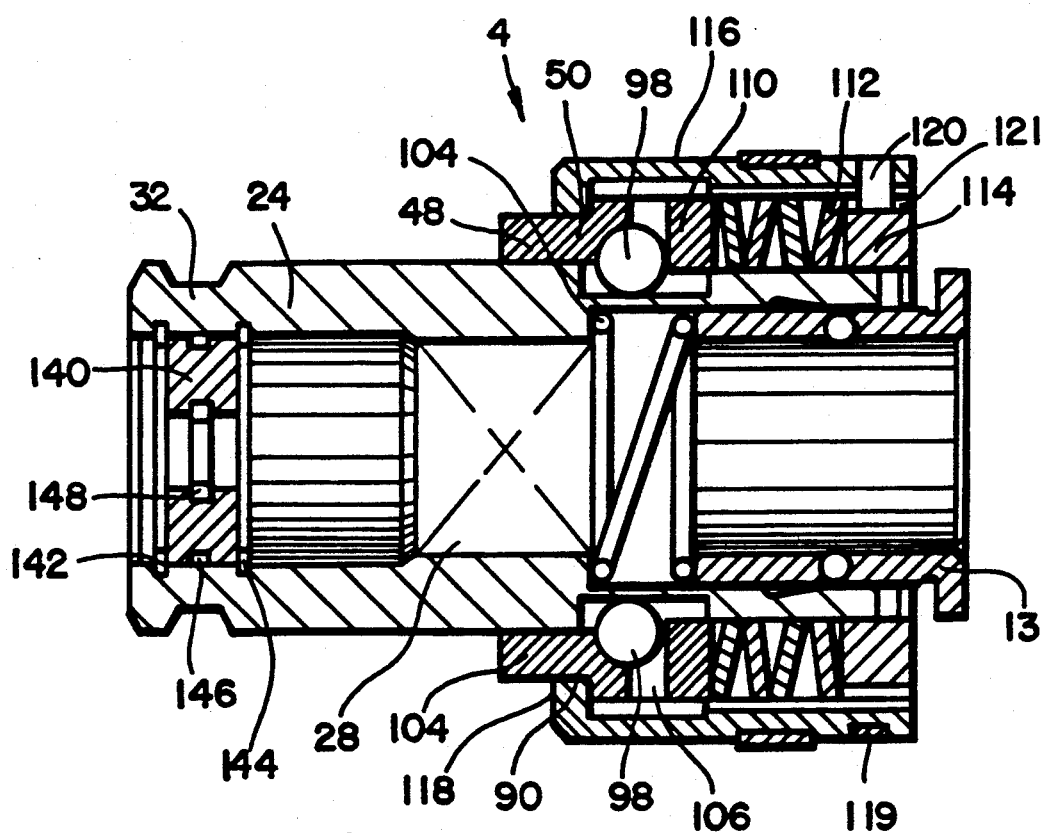
Figure 4:
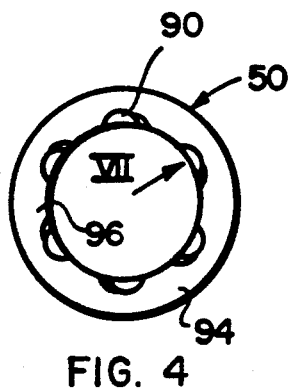
Figure 3:
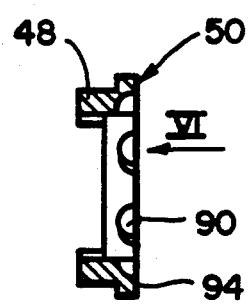
Figure 5:
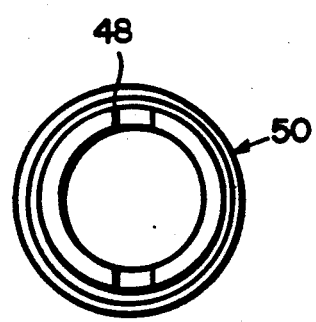
Figure 6:
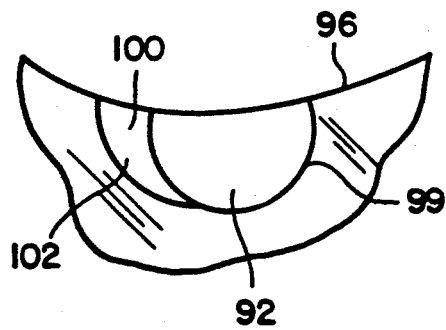
Figure 7:
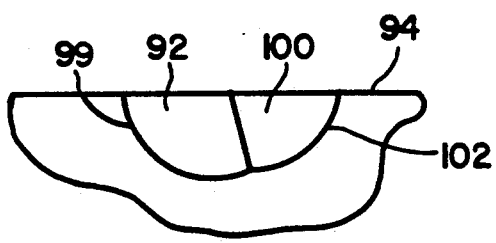
Figure 8:
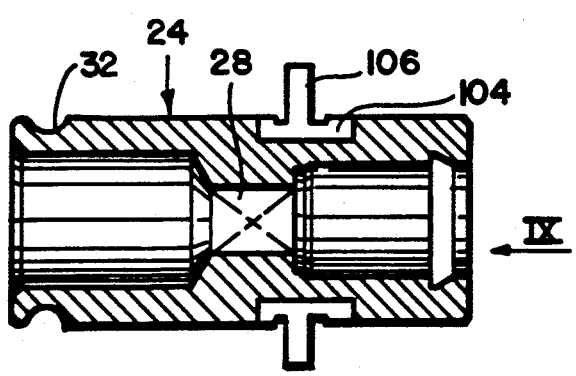
Figure 9:
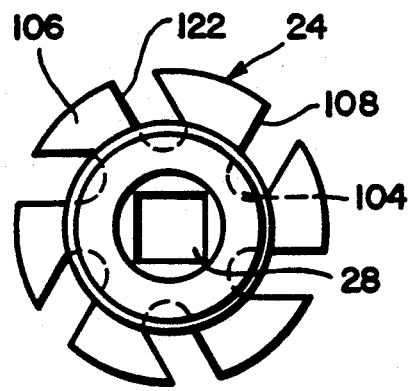
Figure 10:
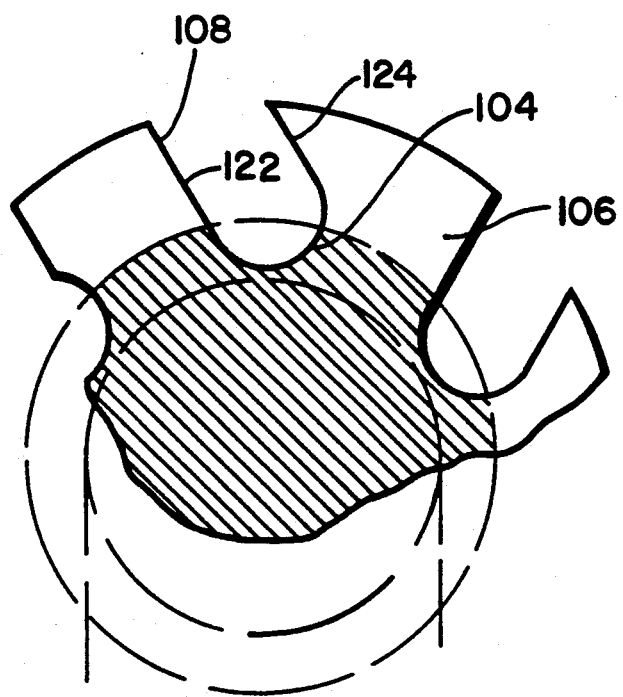
Figure 11:
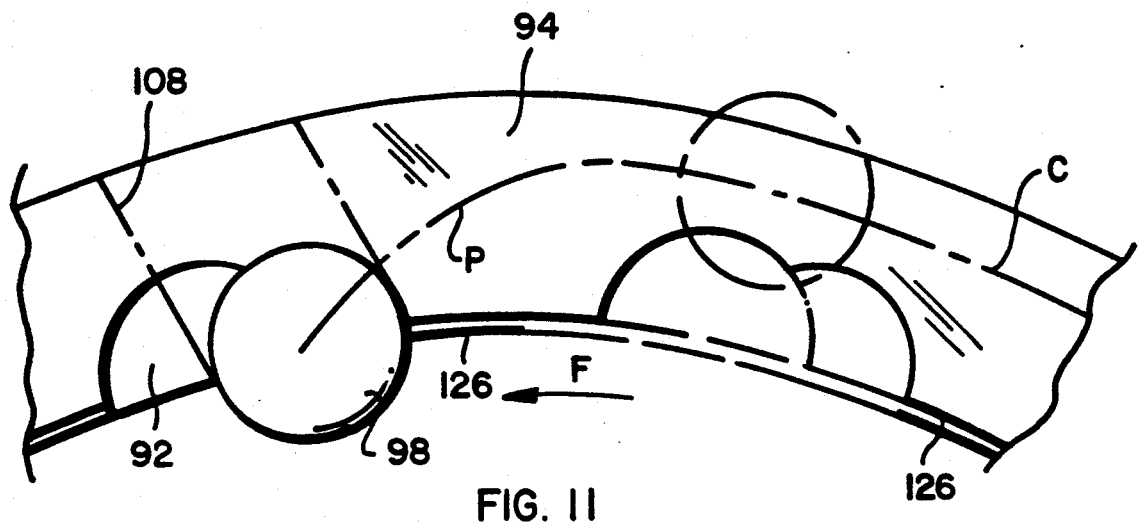
Figure 12:
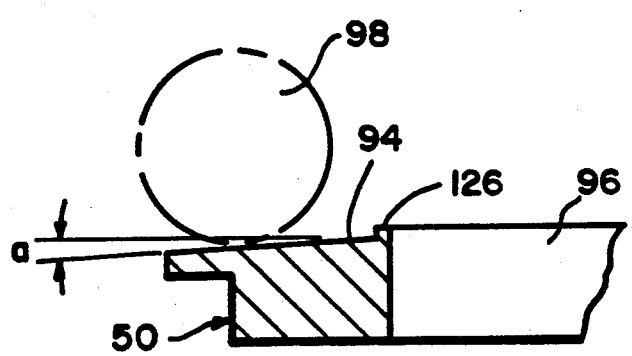

One construction of a tapper for use in a machine tool, and incorporating the various aspects of the invention outlined above, will now be described by way of example only, with reference to the accompanying drawings, in which:

FIG. 1 is a longitudinal section through a tapper holder,

FIG. 2 is a longitudinal section to a larger scale through an adapter part of the tapper, FIG. 3 is a longitudinal section through a driving member, FIG. 4 is an end view looking in the direction of the arrow VI in FIG. 3, FIG. 5 is an end view of the driving member looking on the opposite end to FIG. 4, FIG. 6 is a detail end view looking in the direction of the arrow VI in FIG. 3, FIG. 7 is a detail view looking radially outward from the inside of the driving member as indicated by the arrow VII in FIG. 4, FIG. 8 is a longitudinal cross-section through a driven member, FIG. 9 is an end view looking in the direction of arrow IX in FIG. 9, FIG. 10 is a detail section through part of the driven member to an enlarged scale, FIG. 11 is a detail end view of part of the driving member showing the path of a ball, and FIG. 12 is a cross section through part of the driving member.

The tapper has a machine-tool spindle-engaging part 2, generally referred to as the holder, and an adapter 4 which receives the tap itself (not shown).

The spindle-engaging part of the tapper includes a body 10 which has a tapered shank 12 adapted to fit in conventional manner into the tapered socket of a machine tool spindle (not shown) and to form a taper lock in the spindle, so that the spindle is then able to rotate the tapper about its own longitudinal axis. The body 10 forms a "stationary" part of the tapper, in the sense that once locked in the machine tool spindle, it has no motion other than the rotary motion with the machine tool spindle. A collar 14 is formed on the body 10. Internally, the body 10 has a large bore 16 to accommodate a sleeve portion 8 of a movable part 20, which is adapted to be displaced axially within limits relatively to the stationary body 10. As will hereinafter appear, the mounting of the movable part 20 within the body 10 provides for the transmission of torque from the body 10 to the movable part 20, so that whenever the body 10 is rotated by the machine tool spindle, this rotary motion is transmitted to the movable part 20.

At its forward end, the movable part 20 has a large bore 22, and when the two parts 2 and 4 of the tapper are assembled, the inner end of a generally cylindrical driven member 24 (see FIG. 2) is received within the bore 22, the part of the driven member 24 which is thus received in the bore 22, being a sliding fit thereon. The driven member 24 has a bore which includes a square cross section part 28 within which is received a correspondingly square cross-section end of the shank of the tap (not shown). Hence, when the adapter 4 is fitted into the bore 22 of the movable part 20, the tapper is complete, and ready to receive a tap to perform a tapping operation. The tap is retained in the adapter 4 by a known type of retaining sleeve 13 which does not form part of the invention.

A quick release mechanism is provided for releasably holding the adapter unit 2 in the movable part 20, and this quick release mechanism comprises a ball 30 located in a radial bore in the wall of the movable member 20, and engageable in an annular groove 32 formed near the inner end of the driven member 24. A release collar 34 is slidably mounted on the exterior of the movable part 22 near to the outer end of that part, and a compression spring 36 acting between an external rib 38 on the part 20 and an internal rib 40 in the release collar 34 urges the collar inwardly, to a locking position indicated in FIG. 1, wherein a circlip 42 within the collar 34 engages with the outer face of the rib 38. In this locking position, the internal rib 40 is aligned with the hole in which the ball 30 is located, and as shown in FIG. 1, prevents outward movement of the ball 30 from a position, where it would engage in the groove 32 of the driven member 24. A relatively deep annular recess 44 in the inner end of the release collar 34 can be moved into alignment with the ball 30, by pulling the release collar 34 outwardly, against the action of the spring 36. When the release collar is pulled into this position, the ball 30 can move radially outwards so that it is partly in the groove 44, and in this position, it will allow the cylindrical driven member 24 to pass.

In order to effect a connection between the adapter unit 4 and the movable part 20, the release collar. 34 is pulled outwardly by hand, to bring the groove 44 into alignment with the ball 30, and then the inner end of the driven member 24 is slid into the bore 22. The ball 30 will be pushed outwardly to allow this connecting movement to take place, but once the unit 26 has been fully inserted into the movable member 20, the release collar 34 can be released, so that it moves inwardly under its spring loading, and an inclined face of the groove 44 engages with the ball 30, pressing the ball inwardly into engagement with the groove 32. Once the releaseable collar arrives at the position illustrated in FIG. 1, the ball 30 cannot thereafter move outwardly, and consequently, the adapter unit 26 becomes axially locked within the movable part 22.

At its outer end, the movable part 20 is formed with dogs 46, which in the assembled position engage with dogs 48 on a driving member 50 (see FIGS. 2 to 7) and establish a torque transmitting connection between the movable member 20 and the driving member 50. This driving member 50 forms part of a torque-limiting clutch within the adapter unit 4, which will be described in detail, but essentially its function is to transmit torque to the driven member 24, which receives the actual tap. Consequently, when a connection is established by fitting the adapter 4 into the movable part 20, it is possible to transmit torque from the machine tool spindle, through the body 10, through the connection between that body and the movable part 20, through the dogs 46 and 48, and through the torque-limiting clutch within the adapter unit 4, to the tap itself. This torque transmitting function is the primary characteristic of the tapper.

Reverting now to the connection between the body 10 and the movable part 20, which it will be recalled has to transmit torque, whilst permitting some axial displacement of the part 20 relative to the body 10, it should be mentioned that it is known to provide tappers with this kind of facility. The purpose of allowing the movable part 20 to be pulled out of the body 10, arises from the fact that once the tap has started to cut into the workpiece, continued rotation of the tap causes it to cut an internal screw thread within a bore of the workpiece, and involves an axial feed of the tap. It is impracticable to match the rate of feed of the 0 machine tool spindle precisely to the feed of the tap due to its cutting action. In practice the spindle is usually underfed, that is to say, the rate of feed due to cutting is greater than the rate of feed of the spindle. Hence the movable part 20 has to move axially outwards, i.e. to the right as seen in FIG. 1.

Although the sleeve 18 is generally cylindrical, at one or more positions around its periphery, a groove 53 is machined in the outside of the sleeve. An elongate ball race 52 is fitted around the sleeve 18 and engages in the bore 16 of the body 1, there being a multiplicity of balls arranged in several circles so that the sleeve 18 is both journalled and axially slideable quite freely in the body 10. At these positions a row of three larger balls 54 is fitted in the ball race 52, and these balls engage in the groove 53 of the sleeve 18 and in a matching groove 55 formed in the body 10. Although the larger balls can roll along the grooves 53 and 55 (thereby permitting axial motion of the sleeve 18 in the body 10) they act as keys transmitting rotary motion from the body 10 to the sleeve 18.

It will be appreciated that the bearing arrangement just described permit the sleeve 18, and therefore the movable member 20, to slide axially within the body 10, but provides for torque to be transmitted from the body 10 to the movable part 20.

At its outer end, the sleeve portion 18 of the movable part 20 is of slightly enlarged diameter, so that a small shoulder 58 is formed on the outside of the sleeve. A bearing ring 59 is located in the outer end of the body 10, and the enlarged diameter part of the sleeve 18 in this ring. An initial pressure ball 60 is located in a radial hole in the ring 59 and urged into engagement with the outside of the main portion of the sleeve 18 by a compression spring 62. A screw plug 64 acts on the spring 62 and provides a means of adjusting the spring pressure on the ball 60.

When the tap first encounters the workpiece in which the screw-thread is to be produced, the tap is arrested, but the body 10 continues to advance. The shoulder 58 strikes the ball 60 and the latter will only retract to allow the enlarged portion of the sleeve 18 to move further into the ring 59 when the force acting between the sleeve 18 and the ball 60 produces a radial component force acting on the ball sufficient to overcome the spring 62. Thus there is a very short period when the body 10 is applying a relatively strong force on the tap and this is adequate to enable the tap to bite into the workpiece to commence the tapping action. The strength of this threshold force can be preset by adjusting the screw plug 64.

For the purpose of controlling the permitted axial displacement of the movable part 20, there is a finger-like tubular retaining member 68 extending forwardly into the bore 16, and into a large bore 70 of the sleeve 18, from an internal flange 72 of the body. As shown in FIG. 1, the retaining member 68 is locked on to the flange 72 by a pair of circlips which engage with opposite sides of that flange, and there is a sealing ring 74 providing a liquid-tight seal between the internal flange 72 and the exterior of the retaining member 68.

At its outer end, the retaining member 68 has an external lip 76, and a pair of annular pusher members 78 and 80 are slidably mounted on the outside of the retaining member 68. Outward motion of the outer pusher member 80 is limited by engagement of that member with the lip 76 as illustrated in FIG. 1, and inward movement of the inner pusher member 78 is restricted by engagement of that member with a circlip 82 engaged in the retaining member 68. A compression spring 84 extends between flanges of the pusher members 78 and 80, and holds those members apart, so that in the unloaded condition, the pusher members are engaged respectively with the circlip 82 and the lip 76 all as illustrated in FIG. 1.

Externally, each of the pusher members 78 and 80 is a sliding fit within the bore 70 of the sleeve 18. Moreover, there are circlips 86 and 88 engaged in the bore 70 of the sleeve, which are also engageable respectively, with the outer ends of the pusher members 78 and 80.

The operation of the connection between the body 10 and the movable part 20, which permits axial displacement of the latter, will now be described. In the ordinary operation of the tapper, if the conditions are such that the tap is advancing at a linear speed greater than that of the machine tool spindle, a pull is transmitted from the tap, through the adapter unit 26, to the movable part 20. The movable part is able to move outwardly, because its circlip 86 pushes on the pusher member 78 at the inner end of the sleeve 18, and the pusher member leaves the inner circlip 82. The outward motion of the pusher member 78 is resisted by the spring 84, which is compressed, since the outer pusher 80 cannot move outwardly due to its engagement with the lip 76. Therefore, the extension of the tapper unit is simply resisted by compression of the spring 84.

When the tapping operation is complete, the machine tool spindle is reversed, so that it begins to wind the tap out of the screw-threaded hole formed in the workpiece. During this operation, the spring 84 pushes on the inner pusher member 78, which in turn pushes on the movable part 20 through the circlip 86, thereby returning the movable part 20 to its original axial location within the body 10.

Supposing now that with the movable part in the unloaded position illustrated in FIG. 1, the machine tool spindle is fed towards a workpiece, and the tap carried by the tapper encounters a resistance (as would occur for instance, if the tap is not correctly aligned with the hole in which it is to cut a screw thread or when the tap reaches the bottom of a hole) then the arrangement which has been described will permit a limited contraction of the tapper by inward motion of the moving part 20 relatively to the body 10. In that case, the movable part 20 pushes on the outer pusher member 80 through the circlip 88, so that the pusher member 80 begins to move inwardly, leaving the lip 76. The inner pusher member 78 cannot move further inwardly, due to the circlip 82, and consequently, the spring 84 is again compressed as the pusher members 78 and 80 move towards each other. Thus, the spring 84 is used to resist both extension and contraction of the tapper, and this in itself is a very convenient arrangement.

The construction of the torque-limiting clutch will now be described in detail. The driving member 50 is essentially a ring rotatable on the periphery of the driven member 24, but at six equi-angularly spaced positions, driving sockets 90 are formed in the driving member. Each of the driving sockets 90 has a part spherical deep end portion 92 (see particularly FIGS. 6 and 7) which opens into an end face 94, and also into a bore 96 of the driving member 50. The deep end 92 of each pocket 90 is of a size that will snuggly accept a driving ball 98, and as is clear from FIGS. 6 and 7, the quarter spherical part of the deep end 92 which includes the leading side 9 of each socket 90 (having regard to the direction of rotation of the driving member 50 during a forward or tapping motion) subtends more than 90° around the periphery of a ball fitting within the deep end 92. The significance of this, is that when a ball is located in the deep end 92 of a socket, if a force is applied to the ball to cause it to turn around the longitudinal axis of the tapper, that force will be transmitted from the ball to the driving member 50 to drive that member in the reverse direction, and by virtue of the arc of contact between the ball and the deep end 92, it is impossible for the ball to climb out of the deep end 92 of the driving socket 90.

The driving socket also includes a part spherical shallow portion 100, on the trailing side of each socket 90 (having regard to the direction of rotation of the driving member during a tapping operation) and this shallow portion 100 is also part spherical and adapted to snuggly receive one of the balls 98. However, because the shallow portion 100 is not cut to the same depth into the driving member 50 from the face 94, it does not embrace so large an angle about a ball 98, as the deep end 92. When the driving member 50 is rotating in the forward direction, the trailing edge 102 of the shallow portion 100 engages with the ball 98, and pushes that ball in a circle around the longitudinal axis of the tapper. However, in this direction of motion, it is possible for the ball 98 to climb out of the shallow portion 100 of the driving socket 90, if the resistance to circular motion of the ball 98 exceeds a predetermined amount.

Turning now to the driven member 24, which is illustrated in detail, in FIGS. 8, 9 and 10, at a position which is normally aligned with the driving member 50, a series of six somewhat elongate sockets 104 is formed at equiangular positions around the periphery of the driven member. It will be observed from FIG. 2, that each Of the balls 98 is received in one of the driving sockets 90 of the driving member 50, and also in one of the elongate sockets 104 of the driven member 24. It will be appreciated, that so long as the balls remain in the position illustrated in FIG. 2, rotation of the driving member 50, will be transmitted through the balls to the driven member 24, to provide the necessary rotation of the driven member to rotate the tap.

An annular flange 106 extends outwardly from the driven member 24, and a series of slots 108 is formed in the flange 106, each slot 108 forming an outward continuation of one of the sockets 104. As is clear from FIGS. 9 and 10, the slots 108 are inclined relatively to radii of the driven member, and the location of the flange 106, is such that each of the driving balls 98 is also located in one of the slots 108. The relationship between the slots 108 and the driving sockets 90, is illustrated in chain dotted lines in FIG. 11.

A retaining ring 110 is slidable on the exterior of the driven member 24, and is mounted forwardly of the driving balls 98. A stack of spring washers 112 engages between the forward face of the ring 100 and a pressure ring 114 having screw-threaded engagement in a bore of an annular housing 116 of the adapter unit 26. The housing 116 encloses the driving member 50, ring 110, spring washers 12 and pressure ring 114, and at its inner end, the housing 116 has an inturned lip 118 which engages with a face of the driving member 50 opposite to the face 94, to prevent axial inward motion of the driving member 50. The driving balls 98 are pressed by the retaining ring 110 into the driving sockets 90 of the driving member 50, and this pressure is maintained by the spring washers 112. The strength if this retaining pressure can be adjusted by turning the pressure ring 114 in the housing 116. A locking ring 119 surrounds the housing 16 and has a detent 120 which passes through a slot in the housing 116 and engages in one of a series of angularly spaced notches 121 in the pressure ring 114. This provides a means of securing the pressure ring in a preselected angular position. If there are two slots in the housing angularly spaced by an angle different to that of the spacing of the notches, the number of possible locations in which the pressure ring can be secured is increased.

It will be appreciated, that so long as the retaining ring 110 holds the balls 98 in the driving member 50, the torque-limiting clutch is engaged via the driving balls 98.

When the machine tool spindle begins to rotate, then, as previously described, rotary motion is applied to the driving member 50. At first, the driving balls 98 will probably be located in the deep ends 92 of the driving sockets 90, but by virtue of their engagement in the sockets 104 and also their engagement with the edges 122 of the slots 108, motion is transmitted to the driven member 24. When the tap begins to encounter a resistance, the driving member 50 will tend to move forwardly, in the direction indicated by the arrow F in FIG. 11, relatively to the balls 98. At a preset load, the retaining ring 110 will yield axially slightly, by compression of the spring washers 112, to allow each of the balls 98 to climb into the shallow portion 100 of its socket 90. However, drive will still be maintained from the driving member 50 through the balls 98 to the driven member 24, and this position is illustrated in full lines in FIG. 11. This is in fact the ordinary driving position during a tapping operation, when resistance is being encountered to the rotary motion of the tapper.

Supposing that the tap encounters some excess resistance to its rotation, so that the torque being transmitted through the torque-limiting clutch is increased beyond a threshold value, then the retaining ring 110 will again yield axially, further compressing the spring washers 112, to allow each of the balls 98 to climb first axially and then radially out of its driving socket 90. The axial disengagement of the ball 98 from its driving socket 90 is permitted by the elongate socket 104 in the driven member 24, although of course, the ball will still remain in the socket 104, and in any case, will be within the slot 108 in the flange 106, and therefore will be in driving engagement with the driven member 24. However, as soon as the ball 98 disengages completely from its driving socket, there is no longer a driving connection between the driving member 50 and the ball 98, and consequently the drive through the clutch will be interrupted.

The path taken by each ball 98 as it climbs out of its driving socket 90, is illustrated in FIG. 11 by the chain-dotted line P, which shows the point of engagement between the ball 98 and the end face 94 of the driving member 50. It will be seen that this is a compound radial and circumferential motion, and in fact the path P may have a near involute form. This path is produced by the fact that on the one hand, the ball is still nipped between the face 94 and the retaining ring 110, and therefore tends to turn around the axis of the tapper, but on the other hand, as the ball tries to move forwardly with respect to the slot 98, the leading edge 122 of that slot exercises a radially outward force on the ball, which produces the radial component of the path P.

Eventually, the ball 98 arrives at an outer position, and thereafter, whilst the driving member 50 continues to rotate, the path of the point of engagement between each ball 98 and the face 94 of the driving member 50 is a circle C coaxial with the axis of rotation of the tapper. Now it will be observed from FIG. 11, that this circle C is radially outwards of the sockets 90 in the driving member 50, and this is a very important feature of the invention, because it means that during continued rotation of the driving member 50, the balls 98 do not repeatedly attempt to re enter the driving sockets 90, with the consequent wear on the sockets and the balls, as occurs in some known torque-limiting clutches.

Once the clutch has become disengaged, by the balls 98 climbing out of their driving sockets 90, there is no further transmission of drive to the driven member 24, and consequently less torque is applied to the tap. This is desirable in order to prevent the application of excessive torque to the tap, which as is well known, produces fracture of the taps.

When the spindle of the machine tool is reversed, to wind the tap out of the screw-threaded hole it has formed in the workpiece, each of the balls 98 in the outer position illustrated in chain dotted lines in FIG. 11, will be engaged by the trailing edge 124 of the slot in which that ball is located in the flange 106. Continued rotation of the driving member 50 in the reverse direction will then cause the ball 98 to follow a curved path radially inwards from the outer position, until the ball falls into one of the driving sockets 90 of the driving member. Moreover, since the ball 98 is being urged axially inwardly by the retaining ring 110, the ball will be forced into the deep end 92 of the socket 90. Now it will be recalled, that once the ball is in the deep end 92, it cannot climb out of the socket 90, and consequently, it will simply transmit torque to the driven member 24 in the reverse direction, without exercising any torque-limiting effect. There is of course no need for a torque-limitation in the reverse direction, because the tap is unlikely to encounter any significant resistance to its rotation on the return motion.

It will be appreciated, that it is desirable that each of the balls 98 should travel as rapidly as possible to the outer path C, once it has climbed out of its socket 90. In order to assist in this motion, the face 94 of the driving member 50 is given a slight outward rake (perhaps in the order of 1°) as indicated at a in FIG. 12. Moreover, a very small annular lip 123 is formed around the inside edge of the face 94, so that it tends to prevent any attempt by the ball to move inwardly rather than outwardly once it has become disengaged from the driving socket 90.

The tapper which is being described, is also provided with means for supplying cutting fluid under high pressure, perhaps of the order of 300 lbs. per square inch, through a bore in the tap itself. For this purpose it has already been mentioned that the retaining member 68 makes sealing engagement with the internal flange 72 of the body, and it will be noted that the retaining member 68 has a lengthwise bore 130, which forms part of a passage for the cutting fluid. A flexible nylon pipe 132 is connected by a screw-threaded pipe connector 134 into the front end of the retaining member 68, and the forward end of the pipe 132 is connected to a nipple 136, which at its forward end is part conical.

A ring 140 is a sliding fit in a bore of the driving member 24, and is retained in that bore by circlips 142 and 144—this allows the ring 140 to rotate in the driving member. An O-ring 146 seals between the outside of the ring 140 and the driving member 24. The ring 140 fits over the forward part of the nipple 136 when the adapter 4 is fitted into-the spindle engaging part-2, and is a sliding fit on the nipple. A second O-ring 148 seals between the inside of the ring 140 and the nipple 136.

It is to be noted that the pipe 132 occupies a space in the sleeve 18 forward of the retaining member 68, and within that space, the pipe 132 is formed into two convolutions of a helix. During extension of the tapper by forward motion of the movable part 20, the helical part of the pipe 132 extends in length, to accommodate the forward motion, and conversely, if there is slight contraction in the length of the tapper, this can also be accommodated by contraction in the length of the helical portion of the pipe 132.

The cutting fluid supply is connected into a screw-threaded bore 138 in the inner end of the body 10. From there, the fluid is prevented from entering the large bore 16, which contains the mounting mechanism for the movable part 20 of the tapper, but instead has to pass through the bore 130 of the retaining member 68. From there, it passes through the flexible pipe 132, to the nipple 136 and into the tap itself. When the fluid issues from the nipple 136, it is retained within the ring 140, despite the fact that the ring can rotate on the nipple, and/or the driving member 24 can rotate on the ring 140. The tap itself is bored axially and the cutting fluid is able to flow out through this bore in the tap, from which it issues near to the cutting position and in the hole which is being tapped.

It is the provision of the flexible and extensible pipe 132 which enables a cutting fluid under relatively high pressure to pass through the tapper, without contaminating the working parts of the tapper, and without applying pressure for instance to the inside of the movable parts 20.

It is to be understood, that either of the first and second aspects of the invention can be used without the other. Thus, the torque limiting clutch of the first aspect can be used even if there is no special cutting fluid supply arrangement. Further, the torque-limiting clutch can be substituted by a solid drive adapter.

The toolholder described in the preferred embodiment is for producing right hand threaded holes. It will be appreciated that the toolholder has to be modified in respect of certain "handed" parts if it is required to produce left hand threads. For instance, the shallow parts 100 would have to be on the opposite sides of the deep parts 92 in the driving member 24, and the slots 108 have to be inclined in the opposite direction to that illustrated.

I claim:

1. An axially telescopic tapper for use in a machine tool comprising: a stationary part adapted to be held in the machine tool spindle and a movable part adapted to receive the tap or a tap adapter, thee being provision for limited axial displacement of said movable part relatively to said stationary part, and a cutting fluid supply system inside said tapper and including a flexible conduit attached at one end to said stationary part and at the other end to said movable part, said flexible conduit deviating from a straight linear form, so that it is capable of extension by tending to straighten.

2. An axially telescopic tapper for use in a machine tool according to claim 1, wherein said flexible conduit has at least a part helical formation.

3. An axially telescopic tapper for use in a machine tool according to claim 2, wherein said flexible conduit makes at least one complete convolution which provides the required variable length of conduit to accommodate the permitted extension of said tapper in use.

* * * * *